March 17, 1953
J. B. FRIEDMAN
2,631,645
APPARATUS AND METHOD FOR FORMING
CORRUGATIONS IN TUBING
Filed Sept. 20, 1948
4 Sheets-Sheet 1
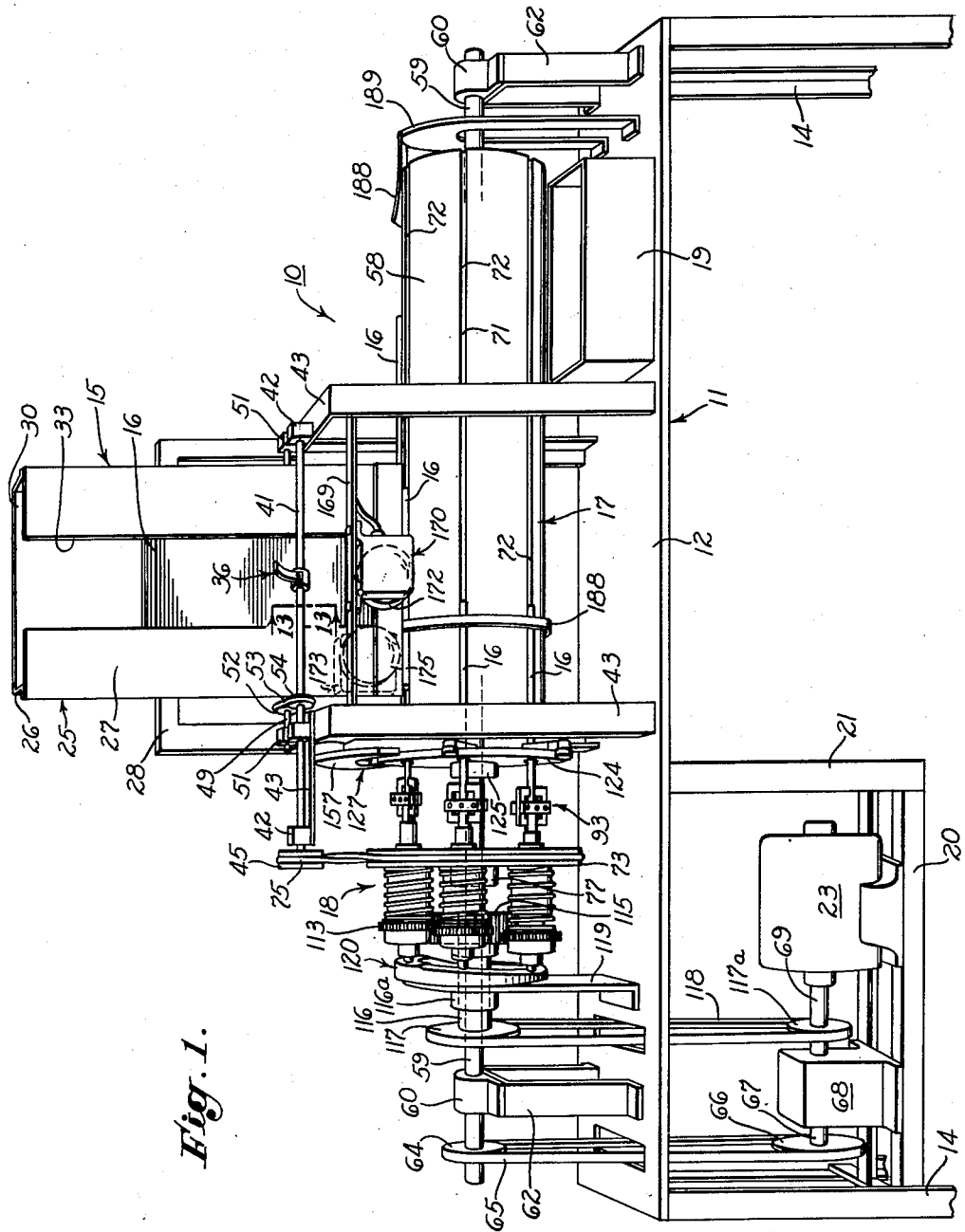
Fig. 1.
INVENTOR.
JOSEPH B. FRIEDMAN
BY HIS ATTORNEYS.
HARRIS, KIECH, FOSTER & HARRIS
BY

March 17, 1953  J. B. FRIEDMAN  2,631,645
APPARATUS AND METHOD FOR FORMING
CORRUGATIONS IN TUBING
Filed Sept. 20, 1948  4 Sheets-Sheet 2
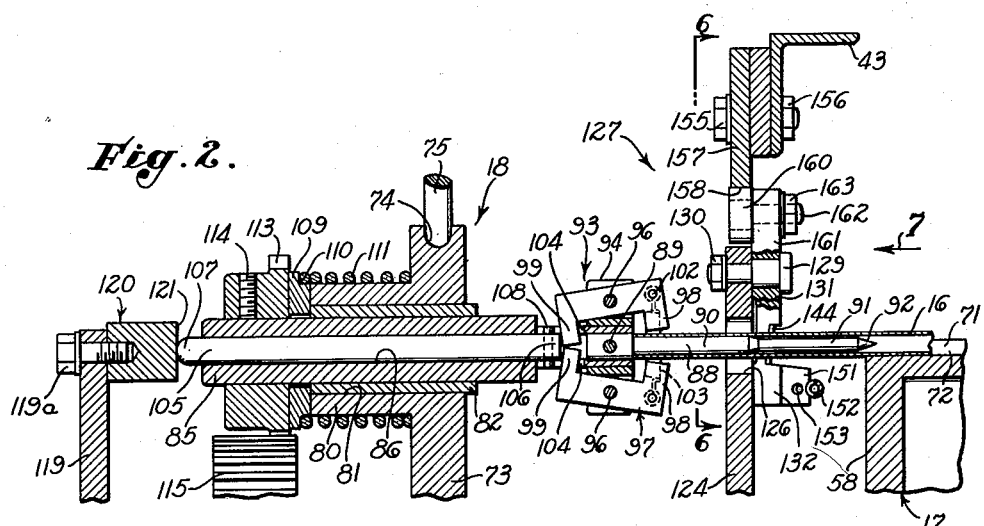
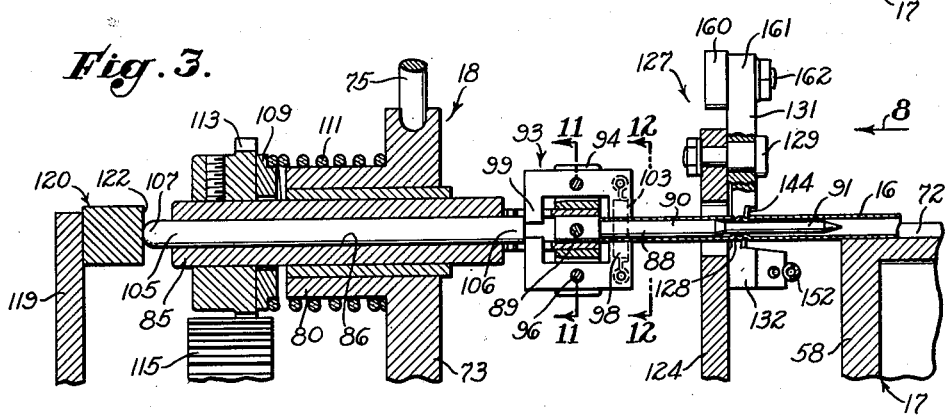
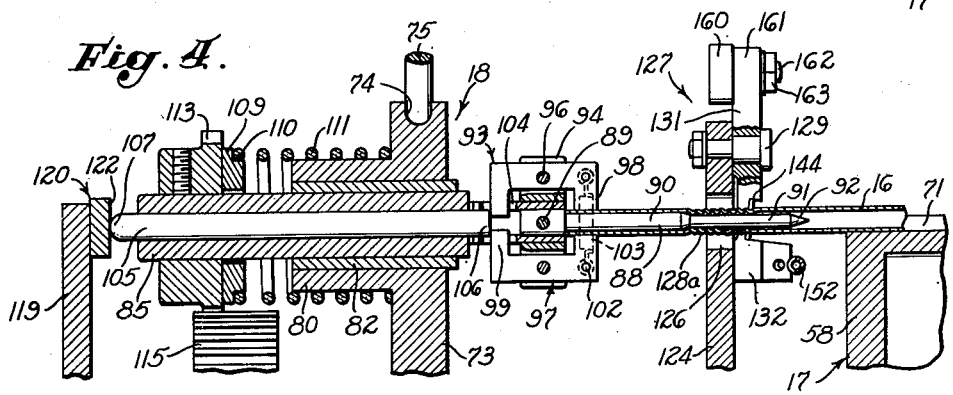
INVENTOR.
JOSEPH B. FRIEDMAN
BY HIS ATTORNEYS.
HARRIS, KIECH, FOSTER & HARRIS

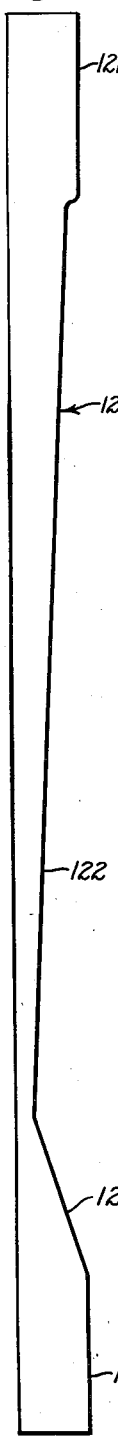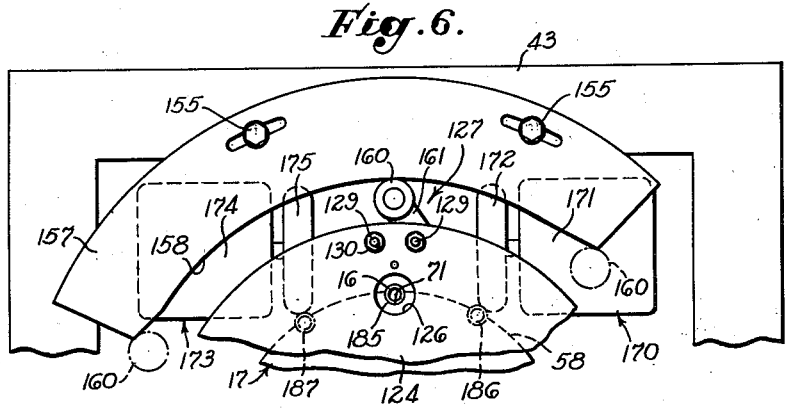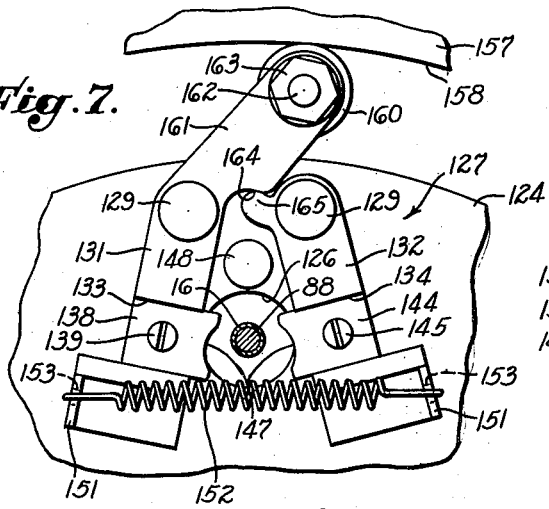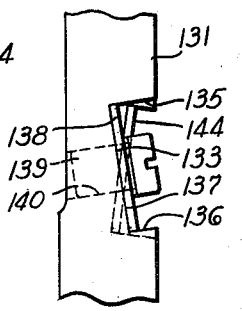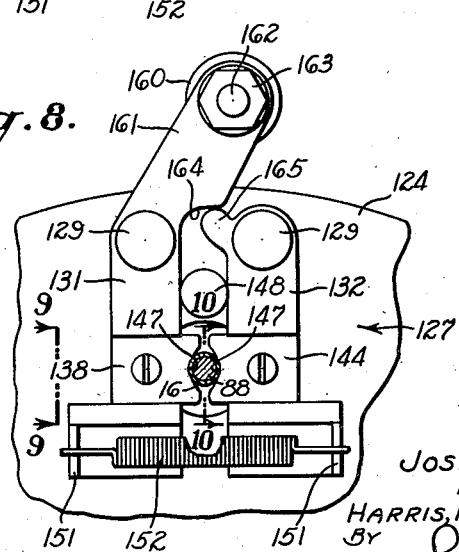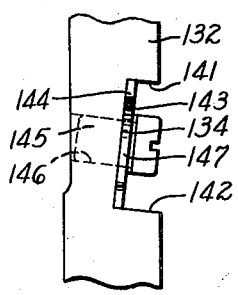

March 17, 1953
J. B. FRIEDMAN
2,631,645
APPARATUS AND METHOD FOR FORMING
CORRUGATIONS IN TUBING
Filed Sept. 20, 1948
4 Sheets-Sheet 4
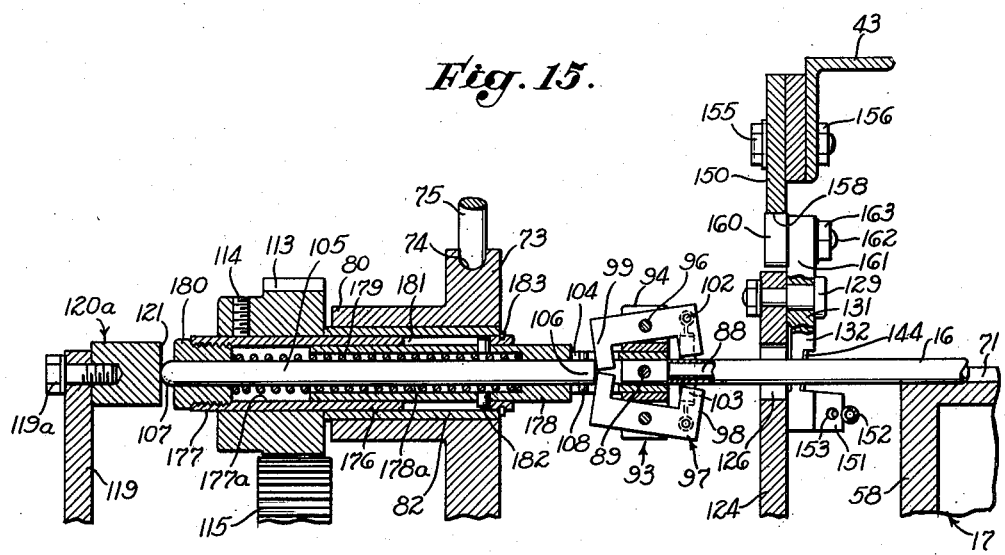
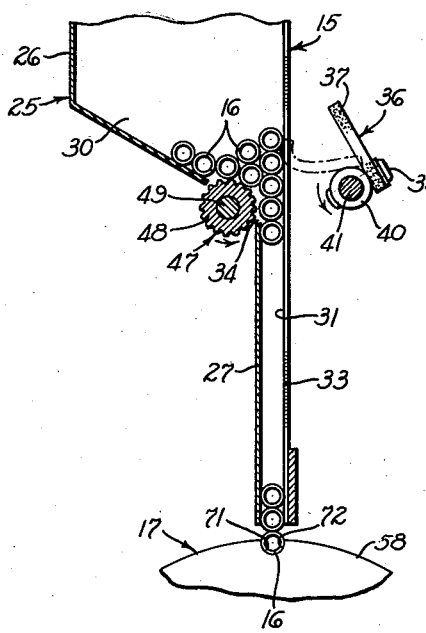
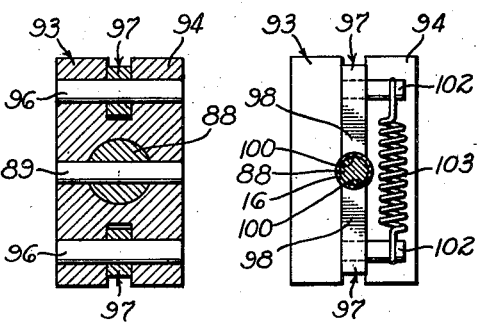
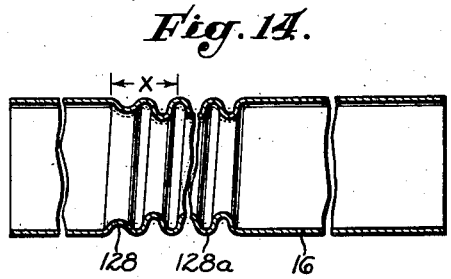
INVENTOR.
JOSEPH B. FRIEDMAN
BY HIS ATTORNEYS.
HARRIS, KIECH, FOSTER & HARRIS
BY Patented Mar. 17, 1953

2,631,645

UNITED STATES PATENT OFFICE 2,631,645

APPARATUS AND METHOD FOR FORMING CORRUGATIONS IN TUBING

Joseph B. Friedman, Maywood, Calif.

Application September 20, 1948, Serial No. 50,082

31 Claims. (Cl. 154—30)

This invention relates to an apparatus for and a method of forming circumferential corrugations in tubing.

Although the apparatus and method which are the subject matter of my invention are described as utilized in forming circumferential corrugations in tubing made of paper, it is not intended that the invention be limited to the creation of circumferential corrugations in tubing formed of any specific material since the principles of the invention can, obviously, be readily applied to creating corrugations in tubing formed from a wide variety of materials. In addition, although the invention is shown and described as applied to the formation of circumferential corrugations in tubing which are helical in configuration, it is not intended that the invention be limited to the formation of such helical configurations since it is possible that circumferential corrugations other than those of the helical type may be formed by my apparatus in accordance with the method described below.

It is customary, at the present time, to form corrugations in relatively thin walled tubing in order that the tubing may be rendered flexible in nature and that it may be applied in places and to uses where conventional rigid or semi-rigid tubing would not be usable. Many ways have been devised for forming such circumferential corrugations in tubing but one of the most obvious and widely utilized apparatus and methods consists in supporting a tubing upon the surface of a mandrel which has formed therein the configuration of the corrugation which it is desired be imparted to the tubing.

After the tubing is supported from the corrugated mandrel, a number of die members are applied to the external surface of the tubing and the mandrel or the die members are rotated. As the relative rotation between the mandrel and the die members takes place, the die members force the material of the tubing into the grooves which are formed by the corrugations in the mandrel. The relative rotation of the mandrel in respect to the die members causes the axial movement of the mandrel in relation to the die members and results in the formation of corrugations in the wall of the tubing. However, since only so much of the tubing area can be devoted to the formation of the corrugations therein as lies upon the corrugated portion of the mandrel, it is obvious that a certain amount of stretching of the material of the tubing as it is forced into the grooves constituted by the corrugations of the mandrel must take place. Consequently, the stretching of the material of the tubing is accompanied by a thinning of the wall of the tubing in the region of the corrugations. Such diminution of the wall thickness of the tubing in the corrugated area cannot be accurately controlled and therefore it is necessary to provide a wall thickness of a much greater strength than would ordinarily be necessary for the uses to which the tubing is to be applied in order to assure that, when the tubing has been corrugated by the above-described method, the wall thickness in the corrugated region will be ample to sustain the loads imposed upon the wall of the tubing in the corrugated area.

It is, therefore, a primary object of my invention to provide an apparatus for forming circumferential corrugations in tubing which will permit the formation of such corrugations in the wall of the tubing without materially diminishing the wall thickness of the tubing in the region of the corrugations. The wall thickness of the tubing can be determined prior to the formation of the corrugations therein and the provision of a corrugated area whose wall thickness is substantially equal to that of the initial wall thickness of the tubing is assured. Thus, the necessity for the provision of tubing having greater wall thicknesses than necessary, as is conventional practice, is eliminated.

One of the greatest obstacles encountered in the formation of circumferential corrugations in tubing by the utilization of the above described corrugated mandrel in conjunction with dies adapted to be applied to the exterior surface of the tubing lies in the fact that, once the material of the tubing is drawn downwardly into the configurations of the mandrel, it is necessary to thread the tubing off the mandrel in order to accomplish its removal therefrom. Since the material of which the tubing is composed is frequently forced into the corrugations of the mandrel by the dies with considerable pressure, it is a problem to remove the tubing from the mandrel after the corrugations have been formed therein.

It is another object of my invention to provide an apparatus for forming circumferential corrugations in tubing which provides a forming means which dispenses with the utilization of a mandrel having configurations embodied therein, the pattern of which is adapted to be transferred to the body of the tubing. It is a related object of my invention to provide an apparatus for forming circumferential corrugations in tubing in which the forming means includes a mandrel adapted to support the tubing in the process of forming the corrugations therein which has a smooth periphery. Thus, the problems encountered in prior art methods in the removal of the tubing from the forming means are eliminated by my invention.

An additional object of my invention is the provision of an apparatus for forming corrugations in tubing which has embodied therein automatic feeding means adapted to feed predetermined lengths of tubing to be corrugated to a receiving means which, in turn, is designed to transfer the tubing to the aforementioned forming means.

A further object of my invention is the provision of an apparatus for forming circumferential corrugations in tubing having embodied therein an automatic feeding means for feeding predetermined lengths of tubing which includes wiper means adapted to simultaneously urge some of said tubings downwardly toward said aforementioned receiving means and associated wiper means adapted to urge the larger portion of said tubings away from said receiving means to prevent the jamming of said tubings in said feeding means.

Another object of my invention is the provision of a receiving means which is adapted to be rotated relative to said feeding means from a first, loading station into a second, charging station and thence into a third, discharging station.

It is a further object of my invention to provide an apparatus for automatically forming corrugations in the body of tubing which has embodied therein receiving means adapted to be rotated into a first, loading station in which said tubings are automatically discharged from said feeding means into said receiving means, thence into a second, charging station in which said tubings are charged automatically from said receiving means into said forming means, and thence into a third, discharging station in which said tubings are automatically removed from said forming means and discharged into a receptacle.

It is an additional object of my invention to provide a receiving means adapted to automatically charge and discharge said tubings into and from said feeding means which includes charging and discharging means.

It is a further object of my invention to provide an apparatus for forming circumferential corrugations in tubing including a forming means which is adapted to cooperate with said receiving means and which embodies a mandrel adapted to support the tubings charged thereupon from said receiving means, said mandrel having a smooth peripheral area.

It is another object of my invention to provide an apparatus for forming circumferential corrugations in tubing which includes a forming means having a mandrel upon which the tubing is adapted to be supported during the process of forming said circumferential corrugations therein and a die member which is adapted to impinge upon the peripheral area of said tubing to form a score line or groove therein. It is a further object of my invention to provide a forming means adapted to form circumferential corrugations in tubings which includes a mandrel and a die member associated therewith which has incorporated therewith means adapted to cause the relative rotation of the mandrel in reference to the die member. A further object of my invention is the provision of such die means associated with the aforesaid mandrel which is automatically actuated to impinge upon the periphery of the tubing after it has been charged upon the mandrel and which is subsequently automatically actuated to release said tubing prior to its discharge from said mandrel.

Another object of my invention is the provision of an apparatus adapted to form circumferential corrugations in tubings which includes a mandrel having a smooth surfaced peripheral area which is adapted to cooperate with an automatically actuatable die member and which is adapted to be axially shifted in reference to said die member.

An additional object of my invention is the provision of an apparatus for forming circumferential corrugations in tubing which includes a mandrel having a smooth peripheral area and an automatically actuatable die member in reference to which said mandrel is adapted to be axially shifted, said mandrel having incorporated thereupon gripping means adapted to grip one end of said tubing to prevent the relative rotation or axial shifting of said tubing in reference thereto.

A further object of my invention is the provision of an apparatus for forming circumferential corrugations in tubing which includes a mandrel having a smooth periphery and a gripping means adapted to secure one end of a tubing upon said mandrel against relative rotation or axial movement in reference thereto, said mandrel being adapted to cooperate with automatically actuatable die means and being axially shiftable in reference thereto.

A further object of my invention is the provision of a mandrel which is adapted to have one end of a tubing fixed thereupon against relative rotational or axial movement and which has its other end adapted to support the free end of said tubing between the jaws of an automatically actuatable die member, said die member being adapted through the intermediary of a score line formed thereby upon the periphery of said tubing to shift said mandrel along its axis.

A further object of my invention is to provide a motion limiting means which is adapted to control the amount of axial movement of said mandrel induced by said die member in such a manner that the axial movement of said mandrel will be limited in reference to the lead of the score lines formed in the periphery of the tubing by said die member.

It is another object of my invention to provide a method of forming corrugations in tubing which will permit the formation of said corrugations without materially diminishing the wall thickness of the tubing in the corrugated area thereof.

It is an additional object of my invention to provide a method of forming corrugations in tubings which will eliminate the problem of placing said tubings upon and removing said tubings from said forming means.

It is an additional object of my invention to provide an apparatus for forming circumferential corrugations in tubings which is relatively simple in construction and which is adapted to function with a minimum of maintenance.

It is an additional object of my invention to provide an apparatus which is extremely flexible in nature and in which both the number of corrugations and the depths thereof which are formed in the tubings can be accurately controlled.

It is another object of my invention to provide a method and apparatus for forming circumferential corrugations in tubings which will materially reduce the expense of forming such corrugations and which will thus permit the substantial reduction in cost of such corrugated tubing.

Other objects and advantages of my invention will become apparent from a perusal of the following specification and the accompanying drawings, which are for the purpose of illustration only, and in which:

Fig. 1 is a perspective view showing an apparatus for forming circumferential corrugations in tubings constructed in accordance with my invention;

Fig. 2 is an enlarged, cross section of the forming means embodied in the apparatus of Fig. 1;

Fig. 3 is an enlarged, cross section of the forming means of the apparatus shown in Fig. 1 in the process of forming circumferential corrugations in a tubing;

Fig. 4 is an enlarged, cross section of the forming means of the apparatus shown in Fig. 1, near the completion of the process of forming circumferential corrugations in a tubing;

Fig. 5 is a development of a cam which constitutes the motion limiting means adapted to cooperate with the mandrel of the forming means of my invention;

Fig. 6 is an enlarged, fragmentary elevational view taken on broken line 6—6 of Fig. 2;

Fig. 7 is an enlarged, fragmentary elevational view of the die means embodied in the apparatus for forming circumferential corrugations;

Fig. 8 is an enlarged, fragmentary view showing the die means in closed position;

Fig. 9 is a fragmentary, enlarged elevational view taken on broken line 9—9 of Fig. 8;

Fig. 10 is a fragmentary, enlarged elevational view taken on broken line 10—10 of Fig. 8;

Fig. 11 is a vertical enlarged sectional view taken on broken line 11—11 of Fig. 3;

Fig. 12 is a vertical, enlarged sectional view taken on broken line 12—12 of Fig. 3;

Fig. 13 is an enlarged, vertical sectional view taken on broken line 13—13 of Fig. 1;

Fig. 14 is an enlarged sectional view of a tubing with corrugations formed therein; and Fig. 15 is a longitudinal sectional view of an alternative embodiment of the forming means of my invention.

Referring to Fig. 1 of the drawings, I show an apparatus 10 adapted for the formation of circumferential corrugations in tubings which includes a base 11 comprising a longitudinally extending bedplate 12 which is supported upon leg members 14 disposed at either end thereof. The apparatus 10 includes a feeding means 15 which is adapted to contain a number of predetermined lengths of tubing 16 and which is adapted also to transfer individual tubings to a receiving means 17 which is disposed below the feeding means 15. Juxtaposed to one end of the receiving means 17 is a forming means 18 which is adapted to receive the tubings from the receiving means 17 and to form circumferential corrugations in the peripheries of the tubings and which is adapted to have the tubings discharged therefrom back onto the receiving means by the use of appropriate charging and discharging means which will be described in greater detail below. A receptacle 19 which is placed below the opposite end of the receiving means 17 to that juxtaposed to the feeding means 15 is adapted to receive the lengths of tubing 16 after the corrugations have been formed in the peripheries thereof. Mounted upon a bed 20 which is supported from the bedplate 12 of the base 11 through the medium of hangers 21 is an electric motor 23 which is adapted to supply the motive power for the apparatus 10 in a manner which will be described in greater detail below.

As is best shown in Figs. 1 and 13 of the drawings, the feeding means 15 includes a hopper 25 having a main body portion 26 and an auxiliary body portion 27 mounted on the bedplate 12 of the base 11 through the medium of frame members 28. The main body portion 26 of the hopper 25 constitutes a container 30 which is adapted to receive a plurality of predetermined lengths of tubing 16 and which is adapted to supply said lengths of tubing to a channel 31 constituted by the auxiliary body portion 27 of the hopper 25. The auxiliary body portion 27 of the hopper 25 is disposed at the front of the hopper and is somewhat greater in length than the main body portion 26 of the hopper although it is only of sufficient width to receive one length of tubing 16 at a time. In other words, the internal dimensions of the channel 31 constituted by the auxiliary body portion 27 are such that it is greater in length than the length of tubing adapted to be carried therethrough but it is only of slightly greater width than the diameter of the tubing to permit the passage of a single tubing 16 through the confines of the channel 31. Thus, the individual lengths of tubing 16 are arranged in a single file one on top of the other in the channel 31 preparatory to being fed thereby onto the receiving means 17.

An elongated vertical opening 33 is formed in the face of the auxiliary body portion 27 of the hopper 25 and a horizontally disposed elongated opening 34 is formed in the underside of the hopper 25 at the juncture of the main body portion 26 with the auxiliary body portion 27. It is obvious that the length and width of the openings, as shown in the drawings, can be easily altered to accommodate the particular dimensions of the tubings being passed through the feeding means 15 and it is not intended that the size of the openings and their particular orientation be a limiting factor.

Juxtaposed to the vertically disposed, longitudinal opening 33 in the auxiliary body portion 27 is a first wiper element 36 which includes a flexible tongue 37 adapted to contact the peripheral area of the tubings 16 preparatory to their descent by gravity into the channel 31 constituted by the auxiliary body portion 27. The flexible tongue 37 may be formed of a plastic material such as rubber or a fabric or fibrous material impregnated with a binder and is mounted by means of a pin 39 upon a collar 40 which, in turn, encompasses a shaft 41 through which the pin 39 is driven in order to fixedly secure the wiper element 36 in a predetermined position in reference to the vertical opening 33. The shaft 41 is rotatably journalled in bearings 42 which are supported upon frame members 43 suitably fastened to the bedplate 12 and the rotation of the shaft 41 in the bearings 42 causes the concomitant rotation of the first wiper element 36. The shaft 41 is so rotated that the tongue 37 of the first wiper element 36 tends to urge or propel the tubings 16 downwardly in the channel 31 and thus prevents a gap between the tubings within the channel 31 and eliminates the possibility that the tubings 16 will not be continuously fed to the receiving means 17. Secured to the end of the shaft 41 and adapted to cause its rotation in the appropriate direction, is a pulley 45 which is adapted to be driven in a manner which will be described in greater detail below.

Juxtaposed to the longitudinal opening 34 formed in the hopper 25 at the juncture of the main body portion 26 with the auxiliary body portion 27 is a second wiper element 47 which includes an elongated, corrugated, cylindrical member 48 which is rotatably mounted upon a shaft 49. The ends of the shaft 49 are mounted in bearings 51 supported upon the frame members 43 and a pulley 52 is secured to one end thereof. Trained upon the pulley 52 is a belt 53 which is adapted to establish an operative relationship between the shaft 49 and the shaft 41 by being trained upon a pulley 54 mounted upon the shaft 41. In this manner, the shaft 49 supporting the second wiper element 47 is adapted to be rotated concomitantly with the shaft 41.

As may be best seen in Fig. 13 of the drawings, the shaft 41 and the shaft 49 rotate in a counterclockwise direction and also rotate at the same speed. However, the first wiper element 36 serves to urge or impel the individual lengths of tubing 16 downwardly in the channel 31 in order to prevent a gap from occurring in the line of tubing established in the channel 31, while the second wiper element 47, through the medium of the contact of the corrugated cylinder 48 with the periphery of the individual lengths of tubing 16 at the juncture of the auxiliary body portion 27 with the main body portion 26 of the hopper, serves to urge the individual lengths of tubing 16 upwardly to prevent the jamming of the lengths of tubing at the point where they enter the channel 31 and thus eliminates the possibility that the tubings become jammed at the entry to the channel 31 and the possibility that the automatic feeding of the tubing 16 to the receiving means 17 be cut off. Thus, the feeding means 15 through the cooperation of the first wiper element 36 with the second wiper element 47, serves to provide a constant and unimpeded flow of individual lengths of tubing 16 to the receiving means 17.

As best shown in Figs. 1 to 4, 6 and 13 of the drawings, the receiving means 17 includes an elongated, horizontally disposed drum 58 which is mounted upon a first drive shaft 59 and is adapted to be rotated thereby in close juxtaposition to the lower end of the channel 31 of the auxiliary body portion 27 of the hopper 25 and which is adapted to receive individual lengths of tubing 16 therefrom. The first drive shaft 59 is journalled in bearings 60 which are supported upon standards 62 suitably secured to the bedplate 12 at either end thereof. Fixed to one end of the first drive shaft 59 is a V-type pulley 64 which has trained thereupon a V-belt 65 which is, in turn, trained upon a pulley 66 mounted upon the shaft 67 of a gear reducer 68. The gear reducer 68 is, in turn, driven by the shaft 69 of the electric motor 23 and serves to substantially reduce the speed of revolution of the motor 23 to a predetermined extent so that the first drive shaft 59 and the components of the apparatus 10 mounted thereupon may be rotated at a substantially constant reduced speed in reference to the other elements of the apparatus 10 which are driven directly from the shaft 69 of the motor 23 in a manner which will be described in greater detail below. Thus, the drum 58 of the receiving means 17 is continuously rotated below the opening constituted by the lower end of the channel 31.

Formed in the periphery of the drum 58 and extending substantially parallel to the axis thereof is a plurality of receptacles 71 which are constituted by elongated, longitudinal, substantially hemispherical slots 72 which extend from one end of the drum to the other. The slots 72 are adapted to receive the lengths of tubing 16 from the lower end of the channel 31 of the hopper 25 and are adapted also to be rotated into a first, loading station, a second, charging station and a third, discharging station.

As best shown in Figs. 1 and 6 of the drawings, the elongated slots 72 are adapted to be rotated from a first, loading station 185 in which the tubings 16 drop into the slots 72 into a second, charging station 186 in which the tubings are charged from the slots 72 into the forming means 18 and thence into a third, discharging station 187 in which the tubings 16 are withdrawn from the forming means 18 and discharged through the slots 72 into the receptacle 19. In this manner, the individual lengths of tubing 16 are automatically expelled from the lower end of the channel 31 of the hopper 25 into the receptacles 71 constituted by the elongated slots 72 of the drum 58 and the point of expulsion of the individual lengths of tubing 16 into the slots 72 is denominated as the first, loading station 185.

As is mostly clearly shown in Fig. 6 of the drawings, a charging means 170 is juxtaposed to the position which the slots 72 assume in relationship to the feeding means 15 when they enter the second, charging station, 186. The charging means 170 is supported on hangers 169 and includes a motor 171 and which has associated therewith in driven relationship a wheel 172 which is adapted to contact the periphery of each tubing 16 and by its clockwise rotation to charge or expel the individual lengths of tubing 16 at the second, charging station into the forming means 18. The motor 171 of the charging means 170 is a high speed motor and the wheel 172 driven thereby rotates at the same high speed and the charging of the forming means 18 with the individual lengths of tubing 16 is thus expeditiously and easily accomplished. The wheel 172 may be formed of rubber or a similar material having a high coefficient of friction in order that the tubings may be readily expelled or charged into the forming means 18.

Juxtaposed to the third, discharging station 187 is a discharging means 173 which comprises an electric motor 174 which is adapted to drive a wheel 175 similar in all respects to the wheel 172 of the charging means 170. However, the wheel 175 of the discharging means 173, as best seen in Fig. 1 of the drawings, is driven in a counterclockwise direction and thus, when contacting the periphery of a tubing in which corrugations have been formed by the forming means 18, serves to withdraw the tubing 16 from the forming means 18 and to discharge it through the length of the slot 72 into the receptacle 19. The comparative ease with which the individual lengths of tubing 16 may be charged into and discharged from the forming means 18 through the cooperation of the charging and discharging means of the receiving means with the drum 58 of the receiving means is an important feature of my invention.

The forming means 18, as best shown in Figs. 1 to 4, includes a circular spindle plate 73 having a centrally located hub portion 77 by means of which it is affixed to the periphery of the first drive shaft 59. Thus, the spindle plate 73 is rotated upon the first drive shaft 59 concomitantly and at the same speed as the elongated drum 58 of the receiving means 17, for a purpose to be described in greater detail below. The spindle plate 73 has a peripheral groove 74 formed therein which is adapted to receive a belt 75, the belt 75 being trained upon the pulley 45 which rotates the shaft 41 of the first wiping element 36 associated with the feeding means 15. As viewed in Fig. 1 of the drawings, the direction of rotation of the spindle plate 73 upon the first drive shaft 59 is toward the viewer, and the belt 75 is twisted in a conventional manner to reverse the direction of rotation so that the pulley 45 and the shaft 41 upon which it is mounted rotate in a direction away from the viewer.

There are formed, as may be best seen in Figs. 2 through 4 of the drawings, integrally with the body of the spindle plate 73 a plurality of spindle bosses 80 which provide longitudinally extending bores or openings 81 adapted to receive sleeve bearings or bushings 82. Reciprocatably disposed within the sleeve bearings 82 and adapted to be axially shifted and rotated therein are hollow spindles 85 having longitudinally extending bores 86 formed therein. In order to facilitate the further description of the forming means 18, the description will be confined to one of the spindle elements of the invention and although the various parts are described in the singular, it will be understood that the parts are duplicated in the other spindles which are mounted in the spindle plate 73.

Secured in one end of the bore 86 of the hollow spindle 85 through the medium of a pin 89, or similar fastener, is one end of a mandrel 88, which is of generally cylindrical configuration and which is possessed of a smooth periphery. The mandrel 88 includes a main body or gripping portion 90 and an auxiliary or forming portion 91 which terminates in a relatively sharp end 92. As may be readily seen from the drawings, the external diameter of the gripping portion 90 of the mandrel 88 is substantially equal to the internal diameter of one of the tubings 16 while the external diameter of the auxiliary or forming portion 91 of the mandrel 88 is substantially less than the internal diameter of the tubing 16, for a purpose to be explained in greater detail below. The mandrel 88 is that portion of the forming means 18 upon which the tubing 16 is supported during the forming of the circumferential corrugations in the peripheral area thereof. The relatively sharp end 92 of the auxiliary or forming portion 91 of the mandrel 88 facilitates the registration of the end of the tubing 16 with the mandrel when it is impelled upon the mandrel by means of the charging means 170.

Although it is conceivable that the main body or gripping portion 90 of the mandrel 88 be capable of engaging frictionally with the interior of the end of the tubing 16 after it has been impelled or charged thereupon by the charging means 170 so that relative rotational or axial movement of that portion of the tubing with respect to the gripping portion 90 would be prevented, there is provided a positive gripping means 93 which is adapted to securely fix the end of the tubing 16 against relative axial or rotational movement with respect to the gripping or main body portion 90 of the mandrel 88. The gripping means 93 includes a pair of gripping jaws 97 which are mounted through the medium of pins 96 upon a mounting block 94 which is secured to the exterior of the end of the spindle 85 by the pin 89 with which the mandrel 88 is also secured in the end of the spindle 85.

As best shown in Figs. 2 to 4 and 11 and 12 of the drawings, the gripping jaws 97 are mounted for rocking movement upon the pins 96 in the mounting block 94 from a position in which they secure the end of the tubing 16 to the main body portion 90 of the mandrel 88 into a position in which they release the end of the tubing 16. The gripping jaws 97 are provided with forward gripping ends 98 which are adapted to impinge upon the end of the tubing 16 and which have formed on the under and upper sides thereof, as best seen in Fig. 12, arcuate surfaces 100 which are adapted to register accurately with the peripheral area of the tubing 16 secured therebetween. Fixed in each of the gripping jaws 97 is a pin 102 which has secured thereto one end of a tension spring 103 which forces the gripping jaws 97 into closed position upon the surface of the mandrel 88 or the end of a tubing 16 supported thereupon. The tension spring 103 thus serves to normally retain the gripping jaws 97 in closed position upon the mandrel 88. The gripping jaws 97 are also provided with rearward actuating ends 99 which extend into the interior of the bore 86 of the spindle 85 through longitudinal openings or slots 104 formed in the wall of the end of the spindle adjacent the point of attachment of the mandrel 88 and the mounting block 94 to the end of the spindle 85.

Disposed within and occupying the major portion of the bore 86 of the spindle 85 is a cylindrical, elongated push rod 105 which has a forward, gripping jaw actuating end 106 and a rearward, cam contacting end 107. Secured in the jaw contacting end 106 of the push rod 105 at right angles to the longitudinal axis thereof is a pin 108 which extends into the slots 104 formed in the wall of the spindle 85 and which prevents the dislodgement of the push rod 105 from the bore 86 of the spindle 85. The push rod 105 through its forward, jaw actuating end 106 and through its contact with the rearward actuating ends 99 of the gripping jaws 97 is adapted to automatically force open the gripping jaws 97 when it is axially shifted within the bore 86 of the spindle 85 against the ends 99 of the gripping jaws 97 in a manner which will be described in greater detail below.

As shown in Figs. 1 to 4 of the drawings, there is mounted upon a frame member 119 which is suitably secured to the bedplate 12 of the base 11 an annular face cam 120 which is adapted to be contacted by the rearward, cam contacting end 107 of the push rod 105 as the push rod 105 is carried in an annular path about the axis of the first drive shaft 59 through the medium of the spindle mounting plate 73. As best shown in Fig. 5 of the drawings, the annular cam 120 includes a dwell portion 121, a gradual drop portion 122, and a sharp rise portion 123.

Mounted adjacent the end of the integral spindle boss 80 and encompassing the periphery of the spindle 85, is an annular collar 109 which is adapted to be axially shifted over the surface of the spindle 85 by means of an expansion spring 111 which encircles the boss 80 and which is seated in an annular flange 110 formed in the collar 109. As may be best seen in Figs. 2 through 4 of the drawings, the expansion spring 111 urges the collar 109 into constant contact with the side of a planetary gear 113 which is fixedly secured to the periphery of the spindle 85 through the medium of a set screw 114 and which is in mesh with a sun gear 115 which, as best shown in Fig. 1, is mounted upon a second drive shaft 116 journalled in a bearing 116a supported upon the frame member 119.

The second drive shaft 116 has a pulley 117 mounted thereupon and a belt 118 trained between the pulley 117 and a companion pulley 117a secured to the motor shaft 69. The second drive shaft 116 is coaxial with and encompasses the first drive shaft 59 but it is, through its direct connection with the motor 23, designed to rotate at a much higher speed than the first drive shaft 59. The sole purpose of the second drive shaft 116 is to provide a means of rotating the sun gear 115, which in turn serves to rotate the associated planetary gear 113 mounted upon the periphery of the spindle 85. The sun gear 115 and the planetary gear 113 serve as transmission means by which the rotation of the second drive shaft 116 may be transmitted to the spindle 85 and thus cause the rotation of the spindle 85 and the mandrel 88 mounted in the end of the spindle.

Thus, as the spindles 85 and their associated push rods 105, gripping jaws 97, and mandrels 88 are carried in a circular path upon the spindle plate 73 through the medium of the first drive shaft 59, the spindles 85 are rotated at a much greater speed about their longitudinal axes through the medium of the second drive shaft 116, the sun gear 115 and the planetary gears 113. Consequently, there are two paths of rotation for the spindles 85 and their associated gripping jaws 97 and mandrels 88, a first, larger and slower path of rotation caused by and about the axis of the first drive shaft 59 and a second faster and smaller axis of rotation about the axes of the spindles 85 caused by the second drive shaft 116.

As may be best seen from Figs. 1 through 4 and 6 through 10 of the drawings, the die means 127, which is adapted to form a circumferential thread or groove in the periphery of the tubings 16 as a portion of the process of forming circumferential corrugations in said tubings, is juxtaposed to the end of the drum 58 of the receiving means 17 and is adapted to cooperate with the mandrels 88 which pass therethrough. Secured to the first drive shaft 59, as by means of a hub portion 125, and adapted to be rotated by the first drive shaft 59 is a circular die mounting plate 124 which is rotated upon the shaft 59 at the same speed as the spindle plate 73 is rotated and also at the same speed as the drum 58 is rotated.

The die mounting plate 124 is provided with a plurality of holes 126 which are radially spaced adjacent the peripheral edge of the plate and through which the mandrels 88 are adapted to extend, as is most clearly shown in Figs. 2 to 4 of the drawings. The die mounting plate is so fixed to the first drive shaft 59 that the holes 126 formed therein are always in a position to permit the axial entry and rotational movement therein of the mandrels 88 and during the concomitant rotation of the die mounting plate 124 and the spindle plate 73 the holes 126 and the mandrels 88 are in continual registry. In addition, the ends of the longitudinal slots 72 which constitute the receptacles 71 of the elongated drum 58 are also in continual registry with the openings 126 in the die mounting plate 124 to permit the passage through the openings 126 from the ends of the longitudinal slots 72 of the individual lengths of tubing 16 onto the mandrels 88.

As most clearly shown in Figs. 1 and 6 to 10 of the drawings, there is mounted about the holes 126 and adapted to cooperate with the mandrels 88 a number of pairs of die mounting arms 131 and 132 which are individually secured to the surface of the die mounting plate 124 through the medium of bolts 129 extending through the plate and secured thereto by means of nuts 130. Since the constructions of the pairs of die mounting arms 131 and 132 and their associated elements which are mounted about the individual holes 126 in the die mounting plate 124 are similar, only one pair of the die mounting arms will be described in detail below.

Formed in the lower end of the die mounting arm 131 is a die blade receiving slot 133 and a die blade receiving slot 134 is similarly formed in the die mounting arm 132. As best shown in Fig. 9, the die blade receiving slot 133 of the die mounting arm 131 has an upwardly sloping top wall 135 and an upwardly sloping bottom wall 136 which are jointed by an obliquely disposed back wall 137. The disposition of the top, bottom and back walls 135, 136 and 137 controls the angle at which a die blade 138 mounted within the slot 133 is disposed. The die blade 138 is secured within the slot 133 by means of a screw 139 which passes therethrough and is threadedly engaged in a hole 140 formed in the die mounting arm 131. As best shown in Fig. 10 of the drawings, the die blade receiving slot 134 of the die mounting arm 132 has a downwardly sloping top wall 141, a downwardly sloping bottom wall 142 and an obliquely disposed back wall 143 and is adapted to suitably position a die blade 144 which is retained within the slot 134 by means of a screw 145 passing therethrough and threadedly engaging a hole 146 in the arm 132. Those ends of the die blades 138 and 144 which contact the peripheral area of the tubing 116 have arcuate forming edges 147 which are adapted to contact the periphery of the tubings 16 and form a score line or groove therein. As is best shown in Fig. 9 of the drawings, the configuration of the die blade mounting slots in the die mounting arms 131 and 132 controls the relationship of the forming edges 147 of the die blades 138 and 144 to each other and the intersection of the die blades 138 and 144, in turn, controls the pitch between the threads formed in the surface of the tubing 16 by the forming edges 147 of the die blades 138 and 144.

The die blade mounting arms 131 and 132 are retained in a normally closed position by means of a tension spring 152, the opposite ends of which are secured in holes 153 formed in ears 151 which are integrally formed on the lower ends of the arms 131 and 132. The action of the spring 152 thus draws the die blades 138 and 144 into contact with the surface of a tubing 16 positioned upon the mandrel 88 and the normal position of the die blade mounting arms 131 and 132 is the closed position. Secured to the face of the die mounting plate 124 and disposed between the upper ends of the die blade mounting arms 131 and 132 is a cylindrical spacer element 148, the diameter of which determines the distance which the arms 131 and 132 are spaced from each other. In other words, the spacer 148 controls the depth of the score line or groove which is formed in the periphery of the tubing 16 by the die blades 138 and 144 by preventing the arms 131 and 132 from carrying the blades 138 and 144 any deeper into the surface of the tubing 16 than a predetermined distance. Of course, the spacer 148 is interchangeable with other similar spacers and the depth of the score line or groove formed in the periphery of the tubing can thus be readily controlled.

As best shown in Figs. 1 through 4 and 6 through 8 of the drawings, there is mounted on one of the frame members 43 through the medium of bolts 155 and nuts 156 an arcuate edge cam 157 whose lower edge 158 is adapted to control and to cause the opening of the die blade mounting arms 131 and 132. The arcuate lower edge 158 of the cam 157 is substantially concentric with the edge of the die mounting plate 124 and is adapted to be contacted by a roller cam follower 160.

The cam follower 160 is rotatably mounted upon an elongated extension 161 of the die blade mounting arm 131 through the medium of a bolt 162 and a nut 163, the bolt extending through concentric openings in the roller 160 and the end of the arm 161. The under side of the elongated extension 161 of the arm 131 is provided with an auxiliary cam surface 164 which is adapted to be contacted by a cam ear 165 formed upon the upper end of the die blade mounting arm 132.

The upper extension 161 of the arm 131 protrudes beyond the edge of the die mounting plate 124 and is maintained in an upwardly extending position by the closing action of the tension spring 152 upon the die blade mounting arm 131. When the rotation of the die mounting plate 124 carries the follower 160 onto the arcuate edge 158 of the cam 157, the extension 161 of the arm 131 is driven downwardly and the cam surface 164 simultaneously contacts the cam ear 165 formed on the upper end of the arm 132. In this manner, the die blade mounting arms 131 and 132 are simultaneously pivoted upon the bolts 129 away from each other and the die blades 138 and 144 are removed from contact with the periphery of the tubing 16. As can be best seen from Fig. 6 of the drawings, the die blade mounting arms 131 and 132 are held in their open position by the cooperative action of the follower 160 with the cam 157 as the drum 58 of the receiving means 17 passes through the first, loading station, the second, charging station and the third, discharging station in order that the tubings 16 may be charged upon the mandrels 88 and discharged therefrom at the completion of the forming of the corrugations in the tubings 16.

When the rotation of the die mounting plate 124 carries the roller follower 160 out of contact with the under side 158 of the cam 157, the release of the roller follower 160 and the concomitant release of the elongated arm 161 permits the tension spring 152 to carry the die blades 138 and 144 against the periphery of the tubings 16. There is thus provided by this construction an automatic means for closing and opening the die blades 138 and 144 to permit tubing to be charged upon and discharged from the mandrel 88. This is an important feature of my invention since it greatly facilitates and expedites the formation of the corrugations in the tubing because the tubing can be readily charged upon and discharged from the forming means 18.

Disposed contiguously to the surface of the drum 58 of the receiving means 17 are a number of shields 188 which restrain any lengths of tubing 16 from being dislodged out of the longitudinal slots 72 formed in the surface of the drum. Positioned at the end of the drum 58 adjacent the receptacle 19 is an end plate 189 which is suitably mounted upon the bedplate 12 and which is adapted to prevent the corrugated lengths of tubing from traveling beyond the end of the slots 72 a sufficient distance to permit them to fall to the floor rather than into the receptacle 19.

The operation of the apparatus 10 can be best illustrated by following a length of tubing 16 through the apparatus in the process of having corrugations formed therein. A number of lengths of tubing 16 are initially loaded into the hopper 25 of the feeding means 15 and the weight of the tubings 16 carries them down in the hopper to the juncture of the main body portion 26 with the auxiliary body portion 27 of the hopper. At this point the tubings 16 drop by gravity into the narrow channel 31 formed by the auxiliary body portion 27 and some of the tubings 16 are urged downwardly therein by the first wiper element 36 while the major number of the tubings are urged away from the opening to the channel 31 by the second wiper element 47 to prevent the jamming of the tubings at the mouth of the channel 31, as best shown in Fig. 13. The tubings 16 drop downwardly in the channel 31 and fall into one of the elongated slots 72 in the drum 58. The tubing 16 drops into the slot 72 at the first, loading station of the drum 58 and the rotation of the drum 58 carries the tubing 16 in the slot 72 into the second, loading station in which the peripheral area of the tube 16, as best seen in Fig. 6, is contacted by the rapidly rotating wheel 172 of the charging means 170.

The rapidly rotating wheel 172 of the charging means 170 impels the tubing 16 upon the end of the mandrel 88 through the opening 126 in the die mounting plate 124 and causes the end of the tubing 16 to assume a position upon the gripping portion 90 of the mandrel 88 between the open gripping jaws 97. The passage of the tubing 16 over the mandrel 88 and through the opening 126 in the die mounting plate 124 is permitted because the die blade mounting arms 131 and 132 are held open by the cam 157 as the die mounting plate 124 and the drum 58 are carried through the second, charging station of the apparatus.

As best shown in Fig. 2 of the drawings, the push rod 105, when its cam contacting end 107 rides upon the dwell portion 121 of the cam 120, is driven to the right against the jaw opening ends 99 of the gripping jaws 97, which are in their normally closed position prior to the time when the end 107 of the push rod 105 reaches the dwell portion 121 of the cam 120. When the end 107 of the push rod 105 strikes the dwell portion 121 of the cam 120, the push rod is driven to the right against the jaw opening arms 99 of the gripping jaws 97. Since the spring 103 which holds the gripping portions 98 of the gripping jaws 97 in the closed position resists the action of the jaw opening end 106 of the push rod 105, the push rod carries the jaws 97, the spindle 85, the planetary gear 113 and the collar 109 to the right against the force of the expansion spring 111 until the collar seats upon the end of the integral boss 80 of the spindle plate 73.

When the collar 109 and the planetary gear 113 are seated against the end of the integral boss 80 of the spindle plate 73, as shown in Fig. 2, the dwell portion 121 of the cam 120 continues to urge the push rod 105 to the right against the force of the jaw closing spring 103 and by its action against the arms 99 of the jaws 97 forces the jaw gripping portions 98 of the jaws 97 away from and out of contact with the surface of a tubing 16 in which corrugations have been previously formed. The gripping jaws 97 are opened simultaneously with the removal of the die blades 138 and 144 from contact with the periphery of the tubing 16 and the tubing 16 is thus automatically released to permit its discharge from the mandrel 88. The gripping jaws 97 and the die arms 131 and 132 are thus held in the open position by the action of the dwell portion 121 of the cam 120 and the action of the cam 157 against the follower 160 to permit the tubing 16 to be charged upon the mandrel 88 between the open die arms 131 and 132 and the open gripping jaws 97.

When the die mounting plate 124 and the drum 58 pass from the second, charging station and the tubing 16 has been charged upon the mandrel 88 by the action of the charging means 170, the cam contacting end 107 of the push rod 105 drops from the dwell portion 121 of the cam 120 onto the gradually inclined drop portion 122 of the cam 120, and the gripping portions 98 of the gripping jaws 97 are carried into gripping contact with the periphery of the tubing 16 to hold the end of the tubing 16 against relative rotational or axial movement in reference to the gripping portion 90 of the mandrel 88.

Concomitantly, the follower 160 of the die mounting arm 131 leaves the cam 157 and the die blades 138 and 144 are closed upon the periphery of the tubing 16 by the action of the tension spring 152 simultaneously with the closing of the gripping jaws 97 upon the end of the tubing, as best shown in Fig. 3 of the drawings.

When the die blades 138 and 144 impinge upon the peripheral area of the tubing 16, they immediately begin to form a score line or groove 128 in the tubing in that portion thereof which overlies the forming portion 91 of the mandrel 88. Of course, the formation of the groove or score line in the tubing 16 by the die blades 138 and 144 is facilitated by the concomitant rotation of the mandrel between the blades as caused by the rotation of the planetary gear 113 which is transmitted to the mandrel through the intermediary of the spindle 85. Thus, upon each rotation of the spindle a thread is formed by the die blades 138 and 144 in the periphery of the tubing 16. It is to be clearly understood that the initial score line or groove 128 formed in the periphery of the tubing 16, as best shown in Fig. 14, merely controls the number of corrugations which will be formed in the tubing 16 and does not form the corrugations per se.

As the score line or groove 128 is formed in the tubing 16 by the rotation of the tubing between the die blades 138 and 144, the score line turns the periphery of the tubing 16 into a screw and the die blades cooperate with the score line 128 to force the body of the tubing to the left, as best seen in Fig. 3 of the drawings. If the tubing were to be maintained in its path of rotation between the die blades 138 and 144 and no axial shifting of the body of the tubing to the left were permitted, it is obvious that the die blades 138 and 144 would eventually cut through the wall of the tubing and sever it.

However, the mandrel 88, because of its mounting in the axially shiftable spindle 85 is axially shiftable relative to the die blades 138 and 144. If the mandrel 88 were suspended between the die blades 138 and 144 in such a manner that it was freely shiftable in an axial direction by the scoring action of the tubing mounted thereupon between the die blades 138 and 144, all that would be accomplished by the passing of the tubing 16 between the die blades would be the formation of a score line or groove 128 in the tubing 16. In order to form the corrugations in the tubing 16, it is necessary that the axial shifting to the left of the mandrel 88 and the tubing supported thereupon be controlled and the gradual drop 122 of the cam 120 serves to control and limit, in a predetermined manner, the axial shifting of the tubing and the mandrel upon which it is mounted. The limiting of the axial movement of the mandrel 88 by the gradual drop 122 of the cam 120 is accomplished through the push rod 105 which is forced against the jaw opening ends 99 of the gripping jaws 97 with sufficient force to retard the axial movement of the mandrel to the left but with insufficient force to overcome the closing action of the jaw closing spring 103, thus preventing the inadvertent opening of the gripping jaws 97.

For the purpose of illustration, let us presume that the pitch of the score line formed in the periphery of the tubing 16, as indicated by the dimension X in Fig. 14 of the drawings, is one-quarter inch. Since the lead of a thread, that is, the distance which the threaded object will travel axially as the thread is rotated, is equivalent to the pitch of the thread, the tubing will tend to travel one-quarter inch for each score line that is formed in it by the die blades 138 and 144. Therefore, if the tubing were permitted to pass unhindered upon a freely axially shiftable mandrel, the tubing and the associated mandrels would shift axially one-quarter inch for each score line that was formed in the periphery of the tubing by the die blades 138 and 144.

As may be best seen from Figs. 2 through 4 of the drawings, while the gripping portion 90 of the mandrel 88 has an external diameter which is substantially equal to the internal diameter of the tubing 16, the forming portion 91 of the mandrel has an external diameter which is substantially less than the internal diameter of the tubing. Thus, when the score lines or grooves 128 are formed in the peripheral area of that portion of the tubing 16 which overlies the forming portion of the mandrel 88, a sufficient space exists between the forming portion 91 of the mandrel 88 and the interior wall of the tubing to permit the formation of a groove or score line 128 which is neither cut nor drawn, but is pressed into the body of the tubing 16. Thus, the wall thickness of the tubing in the corrugated area thereof is maintained at a substantially constant dimension and the difficulties encountered with unequal wall thicknesses in the corrugated areas of conventional tubings are eliminated.

As indicated above, when the mandrel 88 is axially shifted to the left through the axial shifting of the tubing 16 by means of the score line 128 formed therein and the die blades 138 and 144, the gradual drop 122 of the cam 120 resists the axial shifting of the mandrel 88 and the tubing 16 mounted thereupon.

To effect the partial resistance of the cam to the axial movement of the mandrel 88, the drop 122 of the cam 120 is so calculated as to be proportional to the axial advance of the mandrel 88. For instance, since the lead of the mandrel as induced by the one-quarter inch lead of the score line formed in the tubing is equivalent to one-quarter inch, the drop 122 may be calculated to equal only one-eighth of an inch for the one-quarter inch lead imparted to the tubing 16 by the thread 128 and the die blades 138 and 144.

Since the end of the tubing is fixed upon the gripping portion 90 of the mandrel 88 by means of the gripping jaws 97, the relative axial or rotational movement thereof in respect to the gripping portion 90 of the mandrel is obviated and since the scored area of the tubing 16 is being moved to the left faster than the mandrel 88 upon which it is supported is being permitted to move by the drop 122 of the cam 120, the tubing 16 collapses in its scored area and forms corrugations 128a which are deeper than and which are defined by the initial thread 128 formed by the die blades 138 and 144.

In this manner, circumferential corrugations may be formed in the tubing 16 without materially altering the wall thickness of the tubing in the corrugated area since the corrugations are formed not by drawing or cutting the material of the tubing but by deforming the material of the tubing by an initially formed score line or groove in the pattern of the corrugations and then axially compressing the tubing to cause the deformation of the threaded area into deeper corrugations. Essentially, my invention, as a method, consists in forming a score line or groove in the periphery of a tubing and then axially compressing the tubing to cause the collapse thereof in the scored regions to form corrugations which are defined by the score lines initially formed in the tubing.

As may be best seen from Figs. 2 through 4 of the drawings, as the formation of the corrugations in the periphery of the tubing 16 takes place, the axial shifting of the mandrel upon which the tubing is supported, as permitted by but controlled by the face cam 120, causes the simultaneous axial shifting of the spindle, the planetary gear 113 and the collar 109 which is mounted about the spindle 85. When the lowest point of the gradual drop 122 of the cam 120 is reached, as best seen in Fig. 4, the corrugating action is completed and the tubing 16 is ready to be discharged from its position upon the mandrel 88.

The mandrel 88, at the completion of the corrugating process, has shifted its maximum distance to the left, the gradual drop 122 of the cam 120 has reached its lowest point, the planetary gear 113 has shifted to the left in conjunction with the spindle 85 to its extreme point of axial movement, and the spring 111 is in an expanded condition. As will be noted from the drawings, during the entire corrugating process the spindle plate 73, the die mounting plate 124 and the drum 58 have been rotated by the first drive shaft 59 at the same speed and the mandrel 88 has thus been extended through the opening 126 in the die plate 124 during the entire corrugating process to permit the die blades 138 and 144 to form the thread in the periphery of the tubing 16. The gradual shifting of the mandrel to the left is graphically shown in Figs. 2 through 4 of the drawings and Fig. 4, particularly, shows the complete formation of a corrugated area in a tubing 16 prior to the discharge of the tubing 16 from the mandrel 88.

The pitch of the score line formed in the periphery of the tubing 16 is, of course, controlled by the angle at which the die blades 138 and 144 are disposed in reference to each other. As indicated above, we will presume that the pitch of the score line is one-quarter inch, thus allowing four fully completed score lines to an inch. Since the formation of the score line 128 and the subsequent corrugation 128a in the tubing 16 must take place in one rotation of the spindle plate 73, the die plate 124 and the drum 58 or, in other words, the corrugations must be formed in the tubing 16 between the second, charging station 186 and the third, discharging station 187, the mandrel must be rotated four times for each rotation of the spindle plate, die plate and drum in order to form the four score lines in the tubing 16.

In the formation of the four score lines, the mandrel is thus rotated by means of the planetary gear 113 and the spindle 85 four times during one revolution of the spindle plate 73 and its associated die plate and drum. Simultaneously, since the lead of the four score lines, having a pitch of one-quarter inch each is one inch, the scored portion of the tubing 16 is advanced one inch axially to the left although the mandrel is only permitted to move one-half inch by the face cam 120. In this manner, the scored area of the tubing 16 which would normally occupy one inch of the surface length of the tubing 16 is permitted to occupy only one-half inch of the length of the tubing and the corrugations are substantially twice as deep as and have half the pitch of the initial score lines formed in the tubing 16.

It is obvious, of course, that the pitch of the score line formed in the tubing 16 may be controlled by altering the respective angles of the die blades 138 and 144, while the number of score lines formed in the tubing will be controlled by the number of times the mandrel 88 is rotated between the die blades during the one rotation of the spindle plate, die plate and drum. It is also obvious that the depth of the corrugations is controlled by the amount of axial movement allowed to the tubing 16 by the cam 120, since the amount of compression that takes place is controlled by the extent to which the cam 120 limits the axial movement of the tubing 16 upon the mandrel 88. Thus, the characteristics of the corrugations so far as number and the depth thereof are concerned may be controlled by merely changing the pitch of the die blades, altering the speed of rotation of the mandrel and changing the drop of the controlling cam 120.

Upon the completion of the corrugations 128a in the surface of the tubing 16, the spindle 105 strikes the dwell portion 121 of the cam 120 and drives the mandrel 88 to the right. When the maximum extent of travel permitted to the spindle 85 by the gear 113 and the collar 109 fixed thereto takes place, the push rod 105 shifts axially to the right under the compulsion of the dwell portion 121 of the cam 120 and forces open the gripping jaws 97 to release the end of the tubing 16. Simultaneously, the die blade mounting arms 131 and 132 are forced open by the contact of the follower 160 with the arcuate under side 158 of the cam 157. The tubing 16 is now ready to be discharged from the mandrel 88 and the slot 72 of the drum 58 is carried into the third, discharging position in which the rapidly rotating wheel 175 of the discharging means 173 impinges upon the periphery of the tubing and dislodges it from the mandrel, impelling it swiftly to the right and to the end of the drum 58 from which it drops into the receptacle 19.

There is shown in Fig. 15 of the drawings an alternative embodiment of the spindle construction of my invention. In this embodiment, the spindle 176 is formed in two parts and includes a first or outer sleeve 177 which is disposed within the sleeve bearing 82 adjacent the face of a cam segment 120a which serves to unlock the gripping jaws 97 but which does not extend beyond the point at which the jaws are opened and closed and a second or inner sleeve 178 which provides the mounting for the gripping jaws 97 and the mandrel 88. The first or outer sleeve provides a bore 177a in which the second sleeve 178 is adapted to reciprocate and the second sleeve 178 is provided with a bore 178a which is co-axial with the bore 177a of the first or outer sleeve 177. The push rod 105 passes through both the bore 177a and the bore 178a and an expansion spring 179, which has one end seated against the end of the bore 178a of the inner sleeve 178 and its other end seated against a plug 180 which is threadedly engaged in the end of the outer sleeve 177, encircles the push rod 105. The expansion spring 179 serves to force the inner sleeve 178 of the spindle 176 to the right within the bore 177a of the outer sleeve 177.

To prevent the inner sleeve 178 of the spindle 176 from being discharged completely from the bore 177a of the outer sleeve 177 by the action of the spring 179, oppositely disposed slots 181 are formed in the wall of the outer sleeve 177 and stops pins 182 inserted in the wall of the inner sleeve 178 are adapted to contact the ends of the slots 181 to prevent the complete dislodgement of the inner sleeve 178 from the bore 177a. A snap ring 183 which encircles the end of the outer sleeve 177 and projects against the face of the spindle plate 73 serves to prevent the dislodgement of the spindle 176 from the bore of the sleeve bearing 82.

When the corrugations are being formed in the periphery of the tubing 16 and the mandrel 88 and the tubing mounted thereupon are being forced axially to the left by the scoring action of the die blades 138 and 144, the axial movement is transmitted through the mandrel 88 into the inner sleeve 178 of the spindle assembly 176. The movement of the sleeve 178 to the left is resisted, to a certain degree, by the expansion spring 179 and this resistance must be overcome by the scoring action of the die blades upon the periphery of the tubing 16. Thus, the spring 179 acts in exactly the opposite fashion to the spring 111 which is mounted upon the exterior of the boss 80 in the embodiment discussed above, since in the previous embodiment the spring 111 serves to assist to a small degree, the axial shifting of the mandrel 88 and the spindle 85 as induced by the threading action of the die blades upon the periphery of the tubing. In the present embodiment, the provision of the expansion spring 179 in the two-part spindle 176 serves to set up a resistance to the scoring action of the die blades upon the surface of the tubing 16 and causes a corrugating action to take place in the periphery of the tubing by serving to resist the axial movement of the mandrel 88 in the same manner that the cam 120 does in the previously discussed embodiment. The spring 179 is the motion limiting means of the present embodiment. In this manner, corrugations which are more sharply defined and which are of greater depth may be formed in the periphery of the tubing 16 without materially altering the adjustment of the die blades or changing the characteristics of the face cam.

Although I have shown and described two emboidments of my invention herein for the purpose of illustrating the manner of construction and the mode of operation of my invention, it will, of course, be understood that I do not intend to limit my invention to the details of such emboidments since various changes, modifications and substitutions may be made therein without necessarily departing from the spirit of the invention and I, therefore, wish to be accorded the full scope of the following claims.

I claim as my invention:

1. In an apparatus for creating circumferential corrugations in tubing, the combination of: feeding means adapted to supply uncorrugated tubing; continuously rotatable receiving means adapted to receive said tubing from said feeding means; charging means positioned adjacent said receiving means; continuously rotatable forming means positioned adjacent said receiving means adapted to receive a tubing impelled from said receiving means by said charging means; and discharging means positioned adjacent said receiving means adapted to discharge a tubing from said forming means.

2. In an apparatus for creating circumferential corrugations in tubing, the combination of: feeding means adapted to supply uncorrugated tubing; continuously rotatable receiving means adapted to receive said tubing from said feeding means having a first, loading station at which said tubing is delivered to said receiving means, a second, charging station at which said tubing is impelled from said receiving means and a third, discharging station at which said tubing is discharged from said receiving means; charging means positioned adjacent said receiving means; continuously rotatable forming means positioned adjacent said receiving means adapted to receive a tubing impelled from said receiving means by said charging means; and discharging means positioned adjacent said receiving means adapted to discharge a tubing from said forming means.

3. In an apparatus for creating circumferential corrugations in tubing, the combination of: feeding means adapted to supply uncorrugated tubing; receiving means adapted to receive said tubing from said feeding means, said receiving means including an elongated drum having a plurality of tubing receptacles formed therein and each of said receptacles being adapted to be disposed successively at a first, loading station, a second, charging station and a third, discharging station; charging means positioned adjacent said receiving means; forming means positioned adjacent said receiving means adapted to receive a tubing impelled from said receiving means by said charging means; and continuously rotatable discharging means positioned adjacent said receiving means adapted to discharge a tubing from said forming means.

4. In an apparatus for creating circumferential corrugations in tubing, the combination of: feeding means adapted to supply uncorrugated tubing; receiving means adapted to receive said tubing from said feeding means; charging means positioned adjacent said receiving means, said charging means including a rotating member adapted to contact the surface of said tubing to impel it from said receiving means; forming means positioned adjacent said receiving means adapted to receive a tubing impelled from said receiving means by said charging means; and discharging means positioned adjacent said receiving means adapted to discharge a tubing from said forming means, said discharging means including a rotating member adapted to contact the surface of said tubing to draw it from said forming means and discharge it from said receiving means.

5. In an apparatus for creating circumferential corrugations in tubing, the combination of: feeding means adapted to supply uncorrugated tubing, said feeding means including a hopper having a main body portion and an auxiliary body portion, said auxiliary portion having an opening formed therein, and said feeding means also including a wiper means adapted to impel said tubing downwardly in said auxiliary body portion; receiving means adapted to receive said tubing from said feeding means; charging means positioned adjacent said receiving means; forming means positioned adjacent said receiving means adapted to receive a tubing impelled from said receiving means by said charging means; and discharging means positioned adjacent said receiving means adapted to discharge a tubing from said forming means.

6. In an apparatus for creating circumferential corrugations in tubing, the combination of: feeding means adapted to supply uncorrugated tubing, said feeding means including a hopper having a main body portion and an auxiliary body portion, said auxiliary portion having an opening formed therein and said hopper having another opening formed therein at the juncture of said main body portion and said auxiliary portion, first wiper means positioned adjacent the opening in said auxiliary portion adapted to urge said tubing downwardly therein and second wiper means positioned at said juncture opening adapted to move said tubing upwardly; receiving means adapted to receive said tubing from said feeding means; charging means positioned adjacent said receiving means; forming means positioned adjacent said receiving means adapted to receive a tubing impelled from said receiving means by said charging means; and discharging means positioned adjacent said receiving means adapted to discharge a tubing from said forming means.

7. In an apparatus adapted to create circumferential corrugations in tubing, the combination of: a frame; and forming means for said tubing mounted upon said frame, said forming means including a mandrel having a smooth circumference, a gripping portion having an external diameter substantially equal to the internal diameter of said tubing and a forming portion having an external diameter substantially less than the external diameter of said gripping portion, gripping means for holding said tubing upon said mandrel and die means adapted to impinge upon the periphery of said tubing and to form a circumferential score line thereupon.

8. In a forming assembly adapted to create circumferential corrugations in tubing, the combination of: an axially shiftable mandrel adapted to support said tubing; die means movable toward and away from said mandrel adapted to impinge upon and form a circumferential score line in the periphery of said tubing and acting in cooperation with said score line to axially shift said tubing in conjunction with said mandrel; and movement limiting means partially opposing the die-induced axial motion of said mandrel so that said tubing will also be shifted axially in reference to said mandrel to cause said tubing to collapse in the scored region thereof to form corrugations therein.

9. In a forming assembly adapted to create circumferential corrugations in tubing, the combination of: supporting means for said tubing adapted to be positioned within the interior of said tubing and to have one end of said tubing retained thereupon to prevent relative motion between said end of said tubing and said supporting means; and die means movable toward and away from said supporting means adapted to impinge upon and form a circumferential score line in the periphery of said tubing, said die means being adapted to urge the scored portion of said tubing axially of said supporting means to collapse said scored portion to form corrugations therein.

10. In a forming assembly adapted to create circumferential corrugations in tubing, the combination of: supporting means adapted to be positioned within the interior of said tubing and to have one end of said tubing retained thereupon to prevent relative motion between said end of said tubing and said supporting means; rotatable die means movable toward and away from said supporting means adapted to impinge upon and form a circumferential score line in the periphery of said tubing; and rotational means adapted to rotate said supporting means relative to said die means to cause the formation of said score line in said tubing, said die means advancing the scored area of said tubing axially in reference to said supporting means and said one end of said tubing to cause said scored area to collapse into corrugations.

11. In an apparatus for creating circumferential corrugations in tubings, the combination of: a frame; receiving means mounted in said frame having a plurality of receptacles formed therein adapted to receive said tubings; and forming means adapted to be charged with said tubings from said receiving means, said forming means including a plurality of supporting means disposed adjacent the ends of said receptacles, gripping jaws mounted on each of said supporting means for holding one end of each of said tubings against relative axial or rotational movement in reference to said supporting means, die means movable toward and away from said supporting means adapted to impinge upon said tubings and form circumferential score lines therein, and rotating means adapted to rotate said supporting means relative to said die means to cause said die means to form a score line in each of said tubings and to induce the axial movement of said scored portion.

12. An apparatus as set forth in claim 11 in which said receiving means is constituted by an elongated drum and said receptacles in said drum are constituted by a plurality of substantially hemispherical grooves, circumferentially spaced upon the periphery of said drum and arranged substantially parallel to the axis thereof.

13. In an apparatus for forming circumferential corrugations in a tubing, the combination of: a frame; a rotatable spindle plate mounted upon a first drive shaft; a spindle journalled in said plate having cam contacting means thereon; a second drive shaft having transmission means adapted to rotate said spindle in said spindle plate; a mandrel, on which the tubing may be held, mounted fixedly in one end of said spindle to be rotated thereby; die means movable toward and away from said mandrel including die blades for engaging the periphery of said tubing; and cam means mounted on said frame adapted to be contacted by said cam contacting means.

14. An apparatus as defined in claim 13 having gripping jaw means mounted on said spindle adapted to hold one end of said tubing upon said mandrel against relative movement in reference thereto.

15. An apparatus as defined in claim 14 in which said cam contacting means is a push rod on said spindle and contacts said jaw means and is adapted to open said jaw means to release said tubing when axially driven against said jaw means by said cam.

16. An apparatus as defined in claim 15 in which said spindle is axially movable in said spindle plate and the axial movement of said spindle is controlled by the rise and drop of said cam.

17. An apparatus as defined in claim 13 in which said spindle is axially movable in said spindle plate and the axial movement of said spindle is controlled by the rise and drop of said cam.

18. An apparatus as defined in claim 17 in which the axial movement of said push rod as caused by said cam causes said push rod to control the axial and opposite movement of said spindle in said plate.

19. An apparatus as defined in claim 18 in which said spindle bears jaws operable by said push rod which retain one end of a tubing upon said mandrel against relative movement in reference thereto.

20. An apparatus as defined in claim 19 in which said spindle incorporates stop means limiting the axial movement thereof caused by said cam as transmitted by said push rod and said push rod is adapted to open said jaws when said stop means limits said axial movement to release said tubing from said mandrel.

21. An apparatus as defined in claim 20 in which said die means are positioned on either side of said tubing and are adapted to form a score line in said tubing.

22. An apparatus as defined in claim 21 in which said die means are mounted in retractable arms.

23. An apparatus as defined in claim 22 in which said retractable arms are mounted upon a cam follower plate rotatable in conjunction with said spindle plate upon said first drive shaft.

24. An apparatus as defined in claim 23 in which a cam follower is adapted to retract said arms and said die means out of contact with said tubing simultaneously with the release of said one end of said tubing by said gripping jaws.

25. An apparatus as defined in claim 24 in which a die opening cam mounted upon said frame is adapted to cause said cam follower to open said arms.

26. A method of forming circumferential corrugations in a tubing including the steps of: forming a circumferential score line in said tubing by applying a die only to the outer periphery of said tubing; and axially compressing said tubing at said score line to cause the collapse of the scored portion of said tubing into corrugations.

27. A method of forming circumferential corrugations in a tubing including the steps of: fixing one end of said tubing upon an axially shiftable smooth support; forming a circumferential score line in said tubing by applying a die to the periphery of said tubing while on said smooth support; and axially moving the free end of said tubing more rapidly than said fixed end is moved to collapse said tubing at said thread.

28. A method of forming circumferential corrugations in a tubing including the steps of: mounting said tubing on a smooth support; fixing one end of said tubing against axial movement relative to said support; forming a spiral score line in said tubing by applying a die to the periphery of said tubing while on said smooth support; and axially compressing said tubing by means of said spiral score line in the direction of said fixed end to collapse said tubing into corrugations in the scored area thereof.

29. A method of forming circumferential corrugations in a tubing including the steps of: mounting said tubing on a smooth support; fixing one end of said tubing against axial movement relative to said support; rotating said support to rotate said tubing; forming a circumferential score line in said tubing by the application of die means to the periphery thereof while in said smooth support; and axially compressing said tubing by means of said score line in the direction of said fixed end to collapse said tubing into corrugations in the scored area thereof.

30. A method of forming circumferential corrugations in a tubing including the steps of: placing only the periphery of said tubing in a die; establishing relative rotational movement between said die and said tubing; forming a circumferential score line in said tubing by means of said die and the relative rotation between it and said tubing; and axially shifting the scored portion of said tubing to collapse said scored portion into corrugations.

31. A method of forming circumferential corrugations in a tubing including the steps of: mounting one end of said tubing upon an axially shiftable support; fixing one end of said tubing on said support against movement relative thereto; contacting only the periphery of said tubing with die means; rotating said tubing relative to said die means; shifting axially said fixed end of said tubing with said support; forming a circumferential score line in said tubing; and axially shifting the scored portion of said tubing toward said fixed end more rapidly than said fixed end axially shifts to cause the collapse of said scored portion into corrugations.

JOSEPH B. FRIEDMAN.

REFERENCES CITED

The following references are of record in the file of this patent:

UNITED STATES PATENTS

| Number | Name | Date |
| --- | --- | --- |
| 589,694 | Capewell | Sept. 7, 1897 |
| 700,662 | Koffler | May 20, 1902 |
| 1,210,895 | Brinkman | Jan. 2, 1917 |
| 1,843,395 | Lauterbach | Feb. 2, 1932 |
| 1,860,989 | Brinkman | May 31, 1932 |
| 1,954,881 | List | Apr. 17, 1934 |
| 2,002,896 | Kopetz | May 28, 1935 |
| 2,093,155 | Muller | Sept. 14, 1937 |
| 2,390,533 | Hill | Dec. 11, 1945 |